Patented Jan. 29, 1946

2,393,816

UNITED STATES PATENT OFFICE 2,393,816

ELECTRICAL CONTACT ELEMENT

Robert H. Savage, Scotia, N. Y., assignor to General Electric Company, a corporation of New York No Drawing. Application January 1, 1943,
Serial No. 471,074

20 Claims. (Cl. 171—325)

My invention relates to electrical contact elements and particularly to improved contact brushes and methods of making the same.

An object of my invention is to provide an improved electrical contact element.

Another object of my invention is to provide an improved electrical contact element formed of a porous block of electrically conductive material provided with a lubricant for the contact surface thereof.

Further objects and advantages of my invention will become apparent and my invention will be better understood from the following description, and the features of novelty which characterize my invention will be pointed out with particularity in the claims annexed to and forming part of this specification.

It has been found that under normal atmospheric conditions with average humidity, atmospheric water vapor and oxygen together provide one of the best known lubricants for the contact surfaces of carbon and metal-graphite brushes. It has also been found that electrical contact elements made of porous blocks of finely divided electrically conductive material, such as carbon or metal and graphite brushes, tend to wear away very rapidly in dry atmospheres. I have found that impregnating a porous block of electrically conductive material with a lubricant having the property of wetting the carbonaceous material even substantially in the absence of water in the impregnant, such as a mixture of an alcohol-ether and a polyester in at least a portion of the block, to provide a lubricant for the contact surface thereof greatly increases the life of the porous block, especially in dry atmospheres.

I have found this type lubricant especially good for an electrical contact element formed as a porous block of bonded finely divided electrically conductive material, such as carbon, graphite, metal-graphite, or other similar carbonaceous material conventionally used in the manufacture of contact elements, such as commutator and slip ring brushes. In order to provide a lubricant to the contact surface of the porous block, a portion of the contact end of the block or the entire porous block is impregnated with a suitable mixture of an alcohol-ether and a polyester in solution. Among the solutions which have been found useful is an alcohol-ether such as a polyethylene glycol 400 (molecular weight) mixed with a polyester, such as that of a dihydric alcohol and an aromatic dicarboxylic acid or anhydride, as glycol phthalate, which forms a viscous homogeneous liquid at room temperatures in proportions from about 1 to 3 for either compound. I have found a 1 to 1 mixture of these compounds to provide a very efficient lubricant as the polyethylene glycol 400 is a solvent for glycol phthalate and serves as a vehicle for the ester to form a lubricant of flowing character which has the property of wetting the carbon surfaces and pore wall surfaces of the brush even in the absence of water moisture. Other proportions of this mixture also are useful, and impregnation of a brush is facilitated by dilution of the lubricant. A suitable diluent should have a vapor pressure such that an impregnated brush can be dried without substantial loss of lubricant. I have found that toluene may be used as a diluent with 1 to 1 mixtures of polyethylene glycol 400 and glycol phthalate, but only to about 40 parts of diluent per 100 parts of solution; further dilution of the mixture produces a displacement into two phases. Dioxane has also been found to be a very good diluent and may be used at any concentration with polyethylene glycol-glycol phthalate mixtures without phase separation. This diluent has the further advantage of possessing a vapor pressure characteristic very similar to that of water, such that brushes containing it can be treated similarly to brushes impregnated with water solution lubricants.

Polyethylene glycol 400 has been used as an example of a suitable alcohol-ether, but other alcohol-ethers may also be used for this type of non-hygroscopic lubricant. Also mixtures of alcohol-ethers may be employed. Specific examples of suitable alcohol-ethers are compounds commonly termed diethylene glycol, triethylene glycol, tetraethylene glycol, pentaethylene glycol, heptaethylene glycol, hexaethylene glycol, dipropylene glycol, etc. Other polyesters which might be used with the alcohol-ethers either singly or in mixtures of different polyethers or different alcohol-ethers are such materials as are commonly known as diethylene glycol phthalate, triethylene glycol phthalate, etc. Any suitable organic solvent may be used and those mentioned above have been found to be particularly good for the mixtures mentioned. In defining the polyesters as used generally in this specification and claims, the terms "dicarboxylic acids" are intended to include within their meanings the anhydrides of the acids.

In forming my improved contact elements, I have found it desirable to degas the porous block by subjecting it to a relatively low pressure and then impregnating the degassed block with the lubricant, after which excess impregnant is removed from the block, and, in certain cases, a relatively thin coating of material, which does not react with the impregnant, is applied to the sides of the dried block. In degassing the porous block, the contact element is subjected to a high vacuum for a prolonged period, or it is immersed in a solution of the impregnant and the block is then subjected to a relatively low pressure in this solution for from one to four hours. After one of the above degassing treatments, a part or the whole of the porous block is impregnated at substantially atmospheric pressure with lubricant solution for from one to two hours. Excess impregnant then is removed from the outside of the block in any suitable manner, as by wiping or draining. The block then may be dried at temperatures between 50° and 200° C.

While I have described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An electrical contact element including a porous block of electrically conductive material, and a mixture of ingredients including an alcohol ether and a polyester formed by reaction of a dihydric alcohol and an aromatic dicarboxylic acid in at least a portion of said porous block.

2. A molded electrical contact element including a block of finely divided carbon, and a mixture of ingredients including an alcohol ether and a polyester formed by reaction of a dihydric alcohol and an aromatic dicarboxylic acid in at least a portion of said block.

3. An electrical contact element including a porous member of finely divided bonded electrically conductive material, and a mixture of ingredients including an alcohol ether and a polyester formed by reaction of a dihydric alcohol and an aromatic dicarboxylic acid in at least a portion of said porous member.

4. An electrical contact element including a porous graphitic block, and a mixture of ingredients including an alcohol ether and a polyester formed by reaction of a dihydric alcohol and an aromatic dicarboxylic acid in at least a portion of said porous block.

5. An electrical contact element including a block of carbonaceous material, and a mixture of ingredients including an alcohol ether and a polyester formed by reaction of a dihydric alcohol and an aromatic dicarboxylic acid in at least a portion of said porous block.

6. An electrical contact element including a porous block of electrically conductive material, and having at least a portion of said porous block impregnated with a mixture of ingredients including an alcohol ether and a polyester formed by reaction of a dihydric alcohol and an aromatic dicarboxylic acid.

7. An electrical contact element including a porous block of electrically conductive material, and a mixture of ingredients including an alcohol ether and glycol phthalate in at least a portion of said porous block.

8. An electrical contact element including a porous block of electrically conductive material, and a mixture of ingredients including polyethylene glycol 400 and a polyester formed by reaction of a dihydric alcohol and an aromatic dicarboxylic acid in at least a portion of said porous block.

9. An electrical contact element including a block of electrically conductive material, and a mixture of ingredients including polyethylene glycol 400 and glycol phthalate in at least a portion of said porous block.

10. An electrical contact element including a porous member of electrically conductive material, and at least a portion of said porous member having a liquid lubricant for the contact surface of said member including a mixture of ingredients including an alcohol ether and a polyester formed by reaction of a dihydric alcohol and an aromatic dicarboxylic acid in solution in an organic solvent.

11. An electrical contact element including a porous member of electrically conductive material, and at least a portion of said porous member having a liquid lubricant for the contact surface of said member including a mixture of ingredients including an alcohol ether and a polyester formed by reaction of a dihydric alcohol and an aromatic dicarboxylic acid in solution in toluene.

12. An electrical contact element including a porous member of electrically conductive material, and at least a portion of said porous member having a liquid lubricant for the contact surface of said member including a mixture of ingredients including an alcohol ether and a polyester formed by reaction of a dihydric alcohol and an aromatic dicarboxylic acid in solution in dioxane.

13. An electrical contact element including a porous block of electrically conductive material, and at least a portion of said porous block having a liquid lubricant for the contact surface of said porous block including a mixture of ingredients including substantially one part of an alcohol ether to one part of a polyester formed by reaction of a dihydric alcohol and an aromatic dicarboxylic acid.

14. An electrical contact element including a porous block of electrically conductive material, and at least a portion of said porous block having a liquid lubricant for the contact surface of said block including a mixture of ingredients including substantially one part of polyethylene glycol 400 to one part of a polyester formed by reaction of a dihydric alcohol and an aromatic dicarboxylic acid.

15. An electrical contact element including a porous block of electrically conductive material, and at least a portion of said porous block having a liquid lubricant for the contact surface of said block including a mixture of ingredients including substantially one part of an alcohol ether to one part of glycol phthalate.

16. An electrical contact element including a porous block of electrically conductive material, and at least a portion of said porous block having a liquid lubricant for the contact surface of said block including a mixture of ingredients including substantially one part of polyethylene glycol 400 to one part of glycol phthalate.

17. The method of making an electrical contact element including forming a porous block, degassing the porous block, and impregnating at least a part of the degassed porous block with a mixture of ingredients including an alcohol ether and a polyester formed by reaction of a dihydric alcohol and an aromatic dicarboxylic acid.

18. The method of making an electrical contact element including forming a porous block, degassing the porous block, and impregnating at least a part of the degassed porous block with a solution of ingredients including an alcohol ether and a polyester formed by reaction of a dihydric alcohol and an aromatic dicarboxylic acid in an organic solvent.

19. The method of making an electrical contact element including forming a porous block, degassing the porous block, and impregnating at least a part of the degassed porous block with a solution of ingredients including polyethylene glycol and glycol phthalate in dioxane.

20. The method of making an electrical contact element including forming a porous block, degassing the porous block, and impregnating at least a part of the degassed porous block with a solution of ingredients including an alcohol ether and a polyester formed by reaction of a dihydric alcohol and an aromatic dicarboxylic acid in an organic solvent, and removing substantially all of the solvent and excess impregnant from the block.

ROBERT H. SAVAGE.